United States Patent
Drei et al.

[11] Patent Number: 6,098,509
[45] Date of Patent: Aug. 8, 2000

[54] DEVICE FOR GUIDING A BAR AT THE OUTLET OF A LATHE FEEDER

[75] Inventors: Andrea Drei; Enrico Nenni, both of Faenza, Italy

[73] Assignee: Iemca Giuliani Macchine Italia S.p.A., Faenza, Italy

[21] Appl. No.: 09/124,359

[22] Filed: Jul. 29, 1998

[30] Foreign Application Priority Data

Sep. 9, 1997 [IT] Italy ................................ BO97A0547

[51] Int. Cl.⁷ ...................................................... B23B 13/00
[52] U.S. Cl. ............................... 82/127; 82/162; 82/164; 82/163; 414/14
[58] Field of Search ............................. 82/163, 162, 164, 82/127, 126; 414/14, 17; 144/18

[56] References Cited

U.S. PATENT DOCUMENTS

| 4,058,036 | 11/1977 | Austin ........................................ 82/163 |
| 4,634,323 | 1/1987 | Wagber et al. ........................ 82/163 X |
| 5,322,000 | 6/1994 | Hunag .................................... 82/163 X |

FOREIGN PATENT DOCUMENTS 0565779  7/1977  U.S.S.R. .................................... 82/163

*Primary Examiner*—Henry W. H. Tsai
*Attorney, Agent, or Firm*—Guido Modiano; Albert Josif; Daniel O'Byrne

[57] ABSTRACT

A device for guiding a bar at the outlet of a lathe feeder, particularly of an automatic lathe, comprising: a tubular body, which is fixed to the outlet of the feeder coaxially to the rotation axis of the bar; and a plurality of circular annular elements, which are mutually adjacent and lie on planes which are perpendicular to the bar rotation axis and are articulated inside the tubular body about axes which are angularly distributed around the axis and so that the center of the elements can oscillate along a circular path which passes through the axis; the elements have respective arms which protrude outside the tubular body through slots of the body and are articulately coupled to a sleeve which is supported so that it can rotate on the tubular body; the sleeve is controlled by an actuation which turns it in both directions, so as to produce an oscillation of the elements in a position which forms a passage for the bar which is delimited by portions of the circular annular elements.

8 Claims, 3 Drawing Sheets

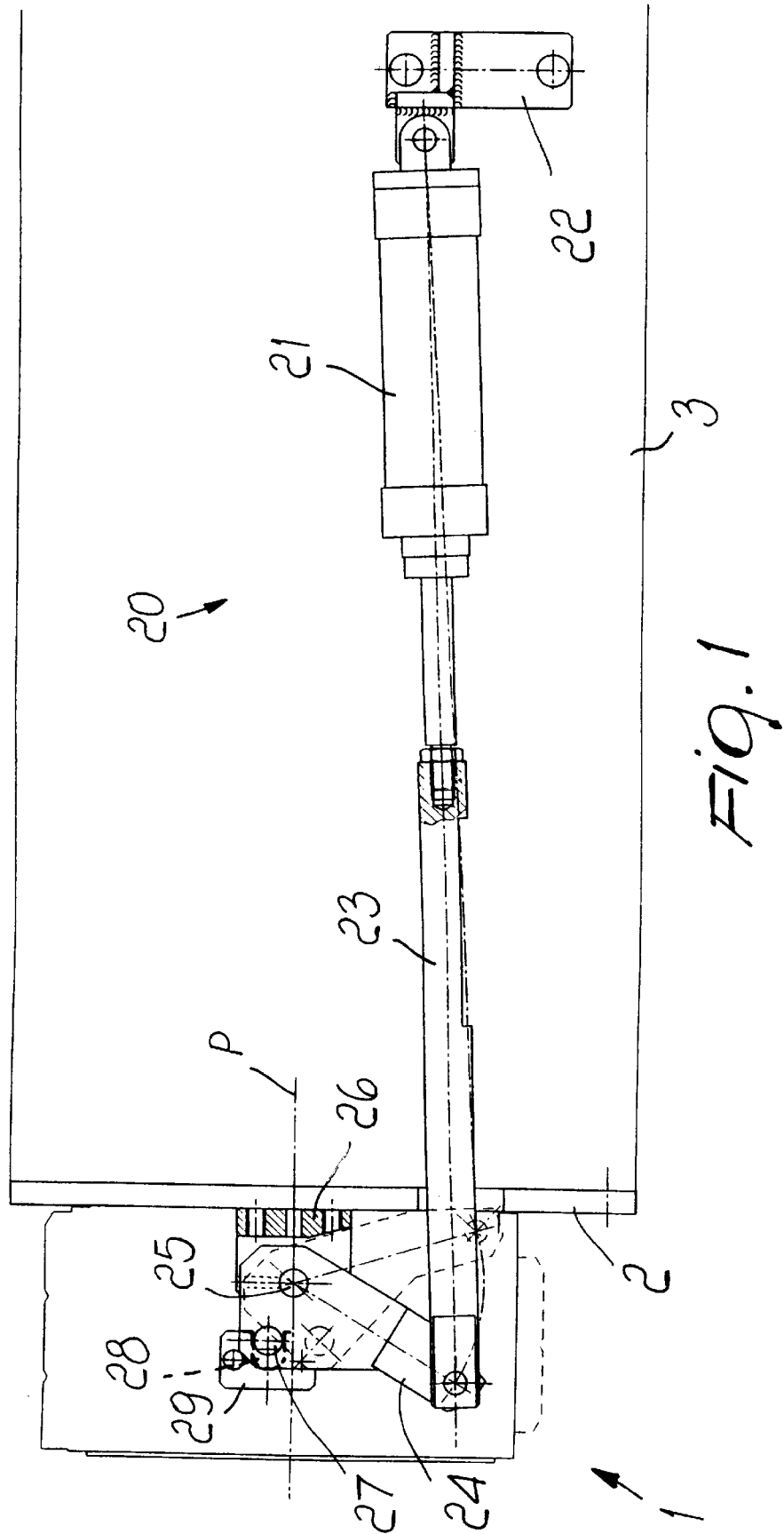

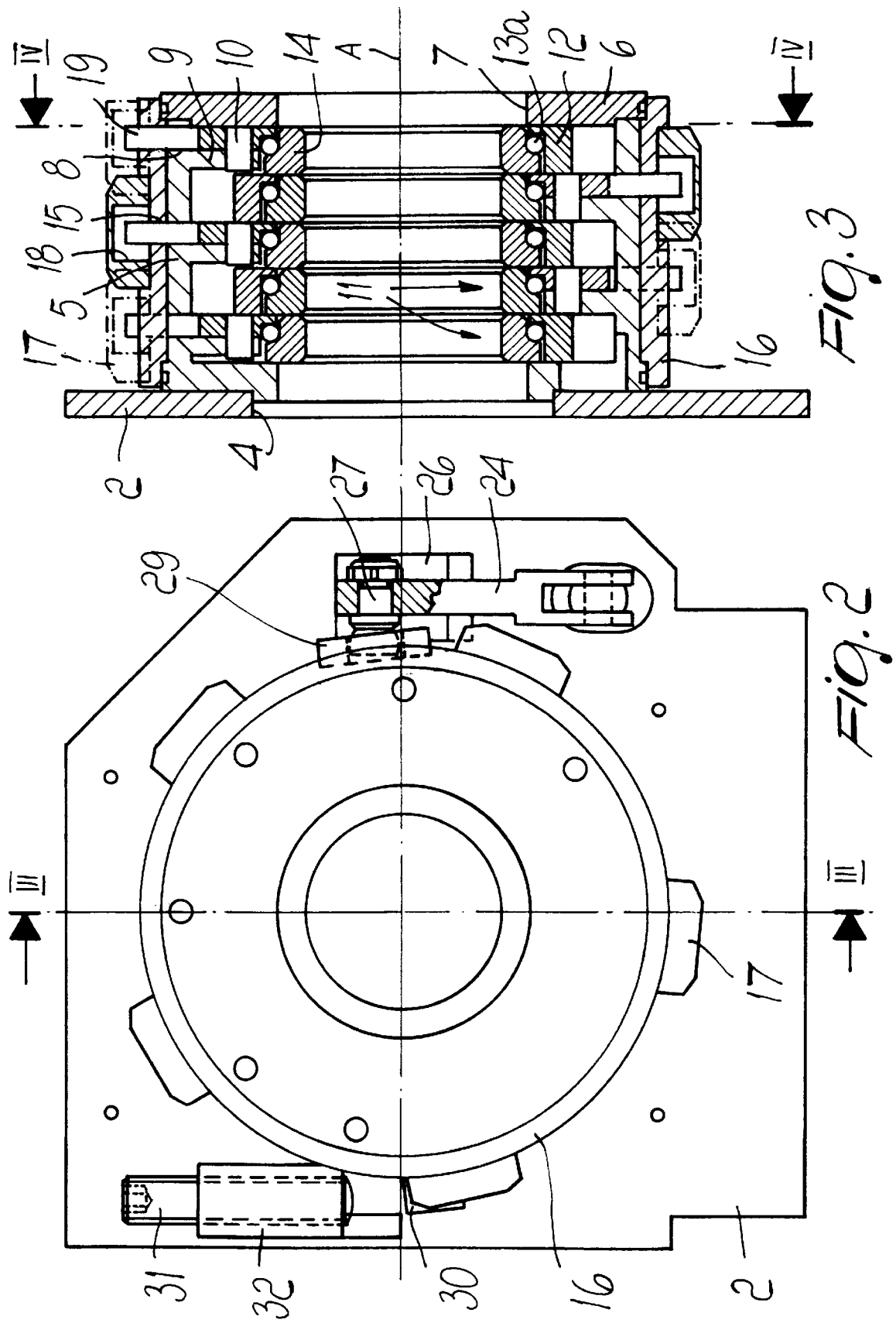

DEVICE FOR GUIDING A BAR AT THE OUTLET OF A LATHE FEEDER

BACKGROUND OF THE INVENTION

The present invention relates to a device for guiding a bar at the outlet of a lathe feeder, particularly an automatic lathe.

It is known that a bar being machined on a lathe is pushed axially by a pusher in the guiding duct of a feeder and in the tubular mandrel of the lathe and is turned by the lathe.

In order to reduce the vibrations that occur during machining, at the outlet of the feeder the bar is guided in a bushing. Since the bars can have different diameters, in order to avoid knocking it is necessary to vary the inside diameter of said bushing as a function of the diameter of the bar.

SUMMARY OF THE INVENTION

The aim of the present invention is to provide a device which can be adapted to the diameter of the bar to be machined, thus allowing to guide bars of any diameter without causing vibration problems and without having to replace the bushing.

This aim is achieved by a device for guiding a bar at the outlet of a lathe feeder, particularly of an automatic lathe, characterized in that it comprises: a tubular body, which is fixed to the outlet of the feeder coaxially to the rotation axis of the bar; and a plurality of circular annular elements, which are mutually adjacent and lie on planes which are perpendicular to said bar rotation axis and are articulated inside said tubular body about axes which are angularly distributed around said axis and so that the center of said elements is oscillatable along a circular path which passes through said axis; said elements having respective arms which protrude outside said tubular body through slots of said body and are articulated to a sleeve which is supported so that it can rotate on said tubular body, said sleeve being controlled by actuation means which turn it in both directions, so as to produce an oscillation of said elements in a position which forms a passage for said bar which is delimited by portions of said circular annular elements.

BRIEF DESCRIPTION OF THE DRAWINGS

Further characteristics and advantages of the present invention will become apparent from the following description of a preferred embodiment, illustrated only by way of non-limitative example in the accompanying drawings, wherein:

FIG. 1 is a side view of the device according to the invention;

FIG. 2 is a front view of said device;

FIG. 3 is a sectional view, taken along the plane III—III of FIG. 2;

DESCRIPTION OF THE PREFERRED EMBODIMENTS

Figure 4:
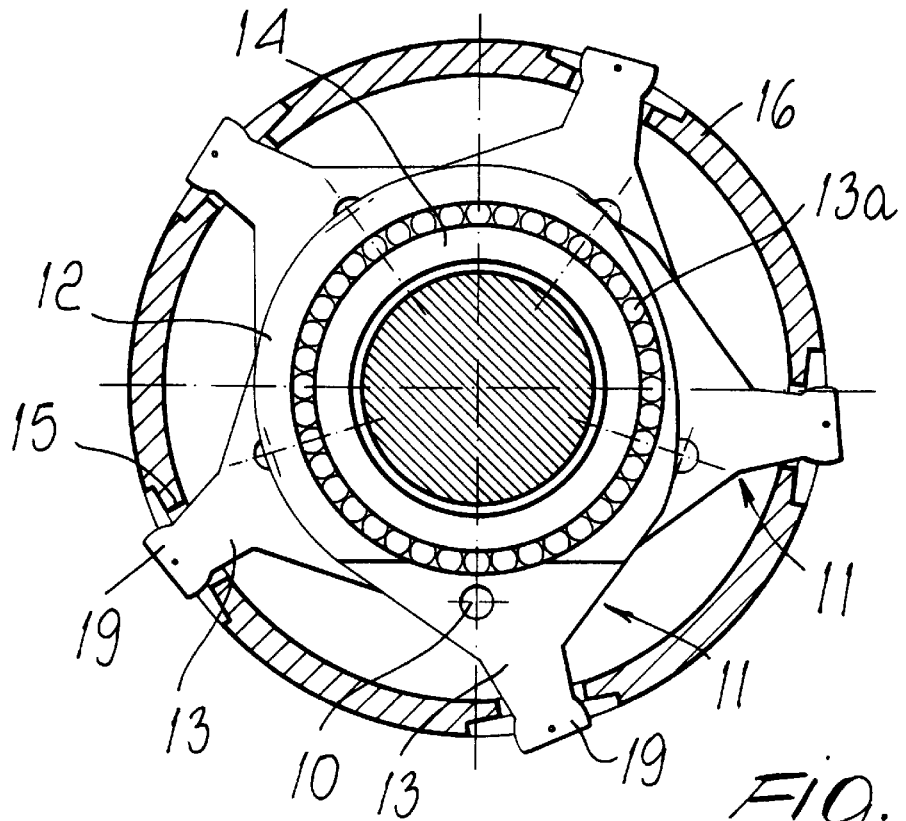
FIG. 4 is a sectional view, taken along the plane IV—IV of FIG. 3.
Figure 5:
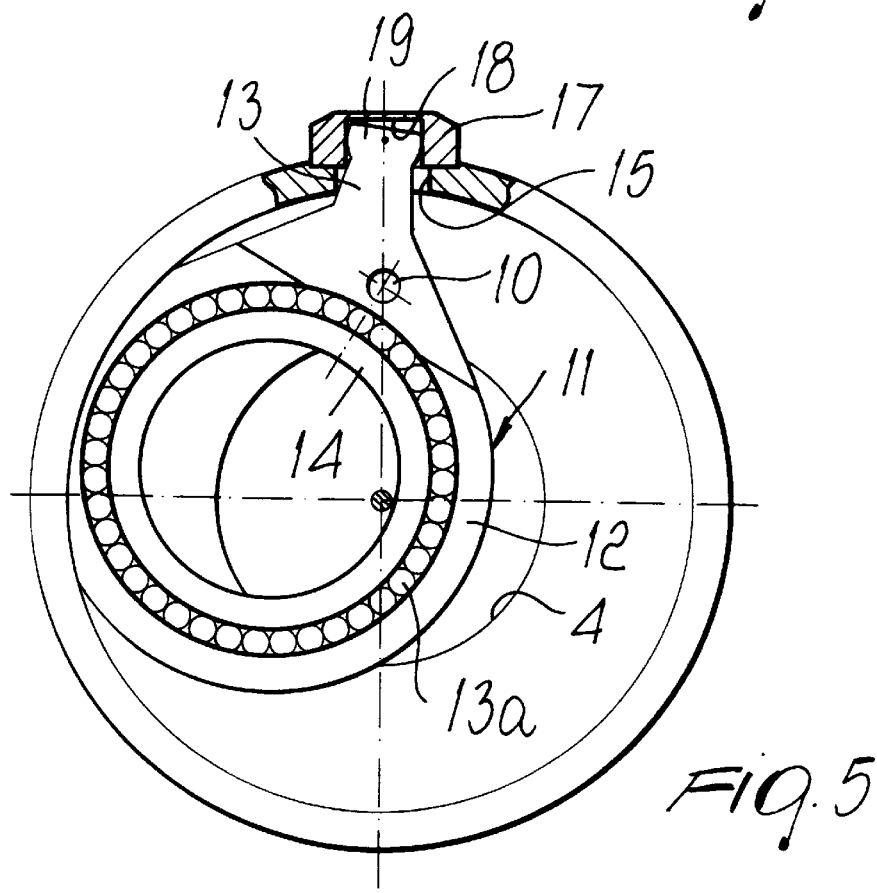
FIG. 5 is a view, similar to FIG. 4, but in a different operating condition.

With reference to the above figures, the device, generally designated by the reference numeral 1, comprises a substantially rectangular plate 2 which is fixed frontally at the end of a bar feeder 3, the rest of which is not shown since it has a conventional structure.

The plate 2 has a circular opening 4 for the exit of the bars, in which a tubular body 5 is centered; said body protrudes from the plate 2 with an axis A which is coaxial to the axis of the tubular mandrel of the lathe in which the bar to be machined must be inserted. On the opposite side with respect to the plate 2, a flange 6 is centered and fixed in the tubular body 5 and has an opening 7 which is coaxial to the opening 4.

A plurality of circumferentially elongated slots 8 are formed in the tubular body 5. The slots 8, which are five in the illustrated example, lie on adjacent planes which are perpendicular to the axis A and are angularly equidistant from each other.

A flap 9 protrudes inwards from the tubular body 5, laterally to each slot 8, and a circular annular element 11 is pivoted in said flap by means of a pivot 10.

In FIG. 3, for the sake of clarity of illustration, the pivots 10 for the annular elements 11 are shown on a same plane and are distributed so that three lie above the axis A and two lie below it. However, it is evident that they are angularly distributed around the axis A.

Each annular element 11 is composed of a collar 12 which has an arm 13 ending with a head 19 which is shaped like a sector of a circle. The pivot 10 for the pivoting of the annular element 11 in the respective flap 9 is located in a point such that the center of the collar 12 travels along a circular path which passes through the axis A.

Each collar 12 forms a seat in which a ring 14 is supported by means of a ball bearing 13a; said ring has a cylindrical inner surface.

The rings 14 are contiguous, so as to form a pack which is as long as the internal length of the tubular body 5. The arms 13 of the collars 12 protrude outside of the tubular body 5 through the respective slots 8 and through additional respective slots 15 formed in a sleeve 16 which is rotationally supported on the tubular body 5.

A cap 17 is fixed on the outside of the sleeve 16, at each slot 15, and encloses a seat 18 in which the head 19 of the arms 13 engages.

It is evident that actuating the rotation of the sleeve 16 in either direction causes the simultaneous oscillation of all the annular elements 11 about the respective pivots 10.

The oscillation of the sleeve 16 is actuated by a pneumatic jack 20 which lies to the side of the feeder 3. The jack 20 comprises a cylinder 21 which is articulated in a bracket 22 which is fixed to the side of the feeder 3. The stem 23 of the jack 20 is articulately connected to the end of a lever 24 which is pivoted by means of a pivot 25 in a block 26 which is fixed frontally to the plate 2, laterally to the sleeve 16.

The lever 24 has an actuation pin 27 for rotating the sleeve 16 which forms a second arm of the lever 24 and engages a slot 28 of a flat strip 29 which is fixed externally to the sleeve 16. Advantageously, the pivot 25 for the articulation of the lever 24 lies on a horizontal central plane P which passes through the axis A of the sleeve 16, and the position of the actuation pin 27 with respect to the pivot 25 for the articulation of the lever 24 is such that the angular strokes of the pin 27, as a consequence of the actuation of the jack 20, occur in both directions with respect to the horizontal central plane P.

A block 30 is fixed outside the sleeve 16, on the opposite side with respect to the flat strip 29, and is adapted to abut against an adjustment screw 31 which is screwed in a threaded bush 32 which is fixed to the front plane 2 to the side of the sleeve 16. The screw 31, by abutting against the block 30, allows to adjust the rotation angle of the sleeve 16 and therefore the oscillation angle of the annular elements 11.

The operation of the described device can be easily deduced from the description given.

When one wishes to insert a bar to be machined in the mandrel of the lathe, the sleeve 16, by means of the jack 20, is actuated so as to cause the annular elements 11 to oscillate into a position in which the internal rings 14 are mutually aligned coaxially to the axis A. In this position, the opening formed by the collars is largest and the bar to be machined can therefore be transferred from the feeder into the mandrel of the lathe.

Then the sleeve 16 is rotated in the opposite direction, so that the rings 14 enclose, along the axis A, a substantially polygonal opening for the passage and guidance of the bar, the dimensions whereof can be adjusted exactly by acting on the abutment screw 31.

During machining, the rotation of the bar also determines the rotation of the rings 14 in peripheral contact therewith. In this manner, the bar is guided without sliding against the internal surface of the rings.

It is evident that the device perfectly achieves the intended aim and objects. In particular, it is noted that the annular elements 11 form a sort of iris diaphragm which automatically adapts to the diameter of the bars.

In the practical embodiment of the invention, the shapes and the dimensions may be any according to the requirements. Advantageously, the rings 14 are internally lined with a material known commercially by the trade-name Vulkollan or are entirely made of Vulkollan.

The disclosures in Italian Patent Application No. BO97A000547 from which this application claims priority are incorporated herein by reference.

What is claimed is:

1. A device for guiding a bar at the outlet of a lathe feeder, comprising:
    a tubular body, which is fixed to the outlet of the feeder coaxially to a rotation axis of the bar;
    a plurality of circular annular elements, being mutually adjacent and lying on planes which are perpendicular to said bar rotation axis, said annular elements being articulated inside said tubular body about axes which are angularly distributed around said rotation axis so as to be oscillatable with centers thereof moving along a circular path which passes through said rotation axis;
    respective arms provided at said annular elements;
    slots provided at said tubular body, said arms protruding outside said tubular body through said slots;
    a sleeve which is supported so as to be rotatable on said tubular body, said arms being articulated to the sleeve;
    actuation means for controllably actuating said sleeve to turn in both oscillating directions, whereby to produce an oscillation of said elements in a position which forms a passage for said bar which is delimited by portions of said circular annular elements;
    a flap protruding inwards from said tubular body, laterally to each said slot; and
    a pivot, a respective said annular element being pivoted at said flap by means of said pivot.

2. A device for guiding a bar at the outlet of a lathe feeder, comprising:
    a tubular body, which is fixed to the outlet of the feeder coaxially to a rotation axis of the bar;
    a plurality of circular annular elements, being mutually adjacent and lying on planes which are perpendicular to said bar rotation axis, said annular elements being articulated inside said tubular body about axes which are angularly distributed around said rotation axis so as to be oscillatable with centers thereof moving along a circular path which passes through said rotation axis;
    respective arms provided at said annular elements;
    slots provided at said tubular body, said arms protruding outside said tubular body through said slots;
    a sleeve which is supported so as to be rotatable on said tubular body, said arms being articulated to the sleeve; and
    actuation means for controllably actuating said sleeve to turn in both oscillating directions, whereby to produce an oscillation of said elements in a position which forms a passage for said bar which is delimited by portions of said circular annular elements;
    wherein each said annular element comprises: a collar; an arm provided at said collar; a head located at an end of said arm, the head being shaped as a sector of a circle, each said collar forming a seat; a ring having a cylindrical internal surface; a ball bearing for supporting a said ring with rings of contiguous said annular elements forming a pack having a length which is equal to an internal length of said tubular body.

3. The device of claim 2, further comprising: additional slots formed in said sleeve, said arms extending through respective said slots of said tubular body and through respective additional slots; a cap being fixed outside said sleeve at each slot; a seat being enclosed by said cap, in which a said respective head of said arms engages.

4. The device of claim 3, further comprising: a pneumatic jack which lies at a side of the feeder for actuating in oscillation the sleeve, said jack comprising a cylinder, which is articulated to the side of the feeder, and a stem; a block which is fixed frontally to the feeder laterally to said sleeve; a lever pivoted to said block, said stem being articulated to the lever and said lever having a pin for rotating said sleeve; a flat strip which is fixed externally to said sleeve and having a slot in which said pin of the lever engages.

5. The device of claim 4, further comprising: a further block being fixed outside said sleeve; a threaded bush being fixed to the feeder; and an adjustment screw being screwed in said bush to adjust a rotation angle of said sleeve and therefore the oscillation angle of the annular elements, said further block abutting against said adjustment screw.

6. A device for guiding a bar at the outlet of a lathe feeder, comprising:
    a tubular body arrangeable at an outlet of a lathe feeder such that a central longitudinal axis of said tubular body extends coaxially to a rotation axis of a bar fed in the feeder; and
    a plurality of circular annular elements movably disposed inside said tubular body in planes which are perpendicular to said central longitudinal axis of said tubular body, said circular annular elements each having a cylindrical inner surface extending about a center axis, and said circular annular elements being pivoted inside said tubular body about respective pivot axes which are mutually angularly distributed about said central longitudinal axis of said tubular body such that said circular annular elements are oscillatable in respective said planes and such that said center axis of said cylindrical inner surface of each circular annular element moves along a circular path which intersects said central longitudinal axis of said tubular body.

7. The device of claim 6, further comprising:
    respective arms of said annular elements;

slots provided at said tubular body, said arms protruding outside said tubular body through said slots;

a sleeve which is supported so as to be rotatable on said tubular body, said arms being articulated to the sleeve at said pivot axes which are mutually angularly distributed about said central longitudinal axis of said tubular body; and actuation means for controllably actuating said sleeve to turn in both oscillating directions, whereby to produce an oscillation of said elements in a position which forms a passage for said bar which is delimited by portions of said circular annular elements.

8. The device of claim 6, wherein said cylindrical inner surface of each circular annular element is defined on an annular ring which is rotatably connected inside a seat of a collar of each circular annular element.

* * * * *